United States Patent [19]

Fujiki et al.

[11] Patent Number: 4,884,650

[45] Date of Patent: Dec. 5, 1989

[54] SLIP DETECTING SYSTEM FOR A FOUR-WHEEL DRIVE MOTOR VEHICLE

[75] Inventors: Haruo Fujiki; Kazunari Tezuka, both of Tokyo, Japan

[73] Assignee: Fuji Jukogyo Kabushiki Kaisha, Tokyo, Japan

[21] Appl. No.: 260,810

[22] Filed: Oct. 20, 1988

[30] Foreign Application Priority Data

Oct. 26, 1987 [JP] Japan .................................. 62-271057

[51] Int. Cl.$^4$ ............................................. B60R 17/34
[52] U.S. Cl. ..................................... 180/197; 180/248
[58] Field of Search ................ 180/197, 247, 248, 233

[56] References Cited

U.S. PATENT DOCUMENTS 4,466,502  8/1984  Sakai ..................................... 180/248
4,511,014  4/1985  Makita .................................. 180/197
4,776,424 10/1988  Naito .................................... 180/247

Primary Examiner—Charles A. Marmor
Assistant Examiner—Donn McGiehan
Attorney, Agent, or Firm—Martin A. Farber

[57] ABSTRACT

A system for detecting a slip for four wheels of a four-wheel drive motor vehicle has a speed difference detector for detecting the difference between the front-wheel speed and the rear-wheel speed and for producing a speed difference signal when the difference is larger than a predetermined value. A wheel acceleration calculator is provided for calculating wheel acceleration, and a vehicle body acceleration detector is provided for detecting vehicle body acceleration. When the difference of the wheel acceleration from the vehicle body acceleration is larger than a predetermined value, and when the speed difference signal is not generated, which means that there is no difference between the front and rear wheel speed, a four-wheel slip signal is generated.

3 Claims, 4 Drawing Sheets

SLIP DETECTING SYSTEM FOR A FOUR-WHEEL DRIVE MOTOR VEHICLE

BACKGROUND OF THE INVENTION

The present invention relates to a system for detecting slips of wheels of a four-wheel drive vehicle having a central differential, which is called a full time four-wheel drive vehicle.

In a four-wheel drive vehicle, slipping will occur either of front wheels or rear wheels, or all of four wheels. The slippings of front or rear wheels can be prevented by locking the central differential. However, since the differential operation is restrained, cornering ability is deteriorated. Further, when the central differential is locked, slipping of the wheels can not be detected, so that it is impossible to automatically control to release the lock of the differential. Accordingly, the differential is manually operated to release the lock at driving on a snowy road having a low friction coefficient $\mu$.

Recently, a torque split control system is provided for controlling the distribution ratio of torque of the engine to front and rear wheels, when front wheels or rear wheels slip. For example, if the front wheels slip, the torque split control system operates to increase the torque applied to the rear wheels, so that slipping of front wheels is prevented. Thus, the vehicle can be driven round a corner with the differential operation.

However, although two-wheel slip can be prevented by controlling the torque distribution ratio, slips of all of four wheels can not be prevented by the torque split control. In order to restrain the slipping of four wheels, for example, the power of the engine is reduced to decrease the traction.

Since a traction control system is operated in relation to slipping of the wheels, a slip detecting system is necessary. Since in the four-wheel drive vehicle, four wheels may slip at the same time, it is necessary to provide a four-wheel slip detector.

Japanese Utility Model Application Laid-Open No. 59-99827 discloses a slip detecting system in which a vehicle speed sensor and tire rotating speed sensors are provided for detecting slipping of a tire. However, the system can not detect slipping of four wheels.

SUMMARY OF THE INVENTION

An object of the present invention is to provide a slip detecting system for a four-wheel drive vehicle which can detect slipping of four wheels with a high accuracy.

According to the present invention, there is provided a system for detecting a slip of four wheels of a four-wheel drive motor vehicle, comprising a front speed detector for detecting front-wheel speed and for producing a front-wheel speed signal, a rear speed detector for detecting rear-wheel speed and for producing a rear-wheel speed signal, a speed difference detector for detecting the difference between the front-wheel speed and the rear-wheel speed and for producing a speed difference signal when the difference is larger than a predetermined value.

The system has a wheel acceleration calculator responsive to the front-wheel speed signal and the rear-wheel speed signal for calculating wheel acceleration, a vehicle acceleration detector for detecting vehicle body acceleration, and a slip detector for detecting acceleration difference of the wheel acceleration from the vehicle body acceleration at nonexistence of the speed difference signal and for producing a four-wheel slip signal when the acceleration difference is larger than a predetermined value.

In an aspect of the invention, each of the front and rear speed detector comprises left and right wheel speed sensors and calculator means for calculating an average speed of the left and right wheel speeds, and the wheel acceleration calculator comprises calculator means for calculating the average wheel speed of the average speeds of front and rear wheels and means for differentiating the average wheel speed.

The other objects and features of this invention will become understood from the following description with reference to the accompanying drawings.

DETAILED DESCRIPTION OF THE PREFERRED EMBODIMENT

Figure 1:
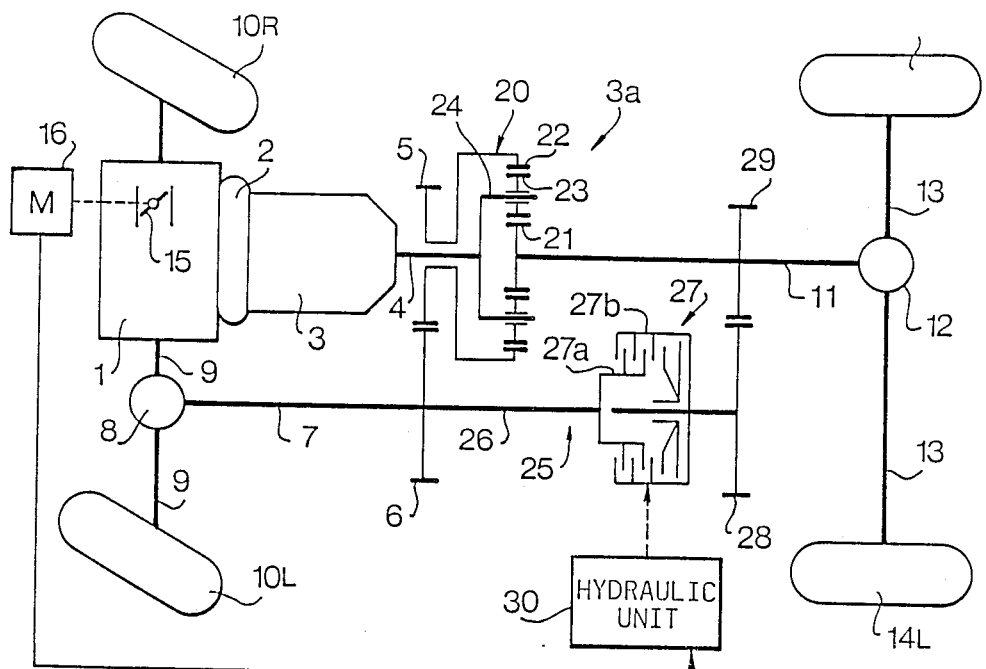
FIG. 1 is a schematic diagram showing a system according to the present invention.

Referring to FIG. 1 showing a power transmission system for a four-wheel drive vehicle, reference numeral 1 designates an engine mounted on a front portion of the vehicle. The power of the engine 1 is transmitted to a transfer device 3a through a torque converter 2 and an automatic transmission 3. In the transfer device 3a, rotation of an output shaft 4 of the transmission 3 is transmitted to a central differential 20. The central differential 20 is a planetary gear device and comprises a sun gear 21, a ring gear 22 having internal teeth, a carrier 24, and planet pinions 23 rotatably supported on the carrier 24 and engaged with the both gears 21 and 22. The carrier 24 is connected with the output shaft 4. The ring gear 22 is connected to a gear 5 rotatably mounted on the shaft 4 and in mesh with a gear 6 having the same diameter as the gear 5 and fixedly mounted on a front drive shaft 7. The front drive shaft 7 is operatively connected to a front differential 8 so as to drive front wheels 10R and 10L through axels 9. On the other hand, the sun gear 21 is fixedly mounted on a rear drive shaft 11 so as to drive rear wheels 14R and 14L through a rear differential 12 and axels 13. Thus, the central differential 20 operates to split the torque of the engine at a ratio determined by the gear ratio thereof. The split torque is distributed to the front and rear wheels by the transfer device 3a as described hereinafter. The difference between speeds of front and rear wheels is absorbed by the central differential.

In the present arrangement of the transmission system, since static load on front part of the vehicle is larger than that of rear part, the central differential 20 is adapted to transmit a large torque to the front wheels through the ring gear 22 having a large diameter and to transmit a smaller torque to the rear wheels through the sun gear 21 having a small diameter.

In the system of the present invention, a torque split control device 25 is provided over the central differential 20. The torque split control device 25 includes gears 5 and 6, a bypass shaft 26 coaxially secured to the front drive shaft 7, a gear 29 secured to the rear drive shaft 11, and a gear 28 in mesh with the gear 29. The gears 28 and 29 are arranged to have a gear ratio which is slightly smaller than 1. The shaft 26 is connected to a hub 27a of an oil hydraulic clutch 27 and gear 28 is secured to a drum 27b of the clutch 27. The clutch has a plurality of disks secured to the hub 27a and drum 27b, respectively.

The clutch 27 is arranged to transmit the torque from a higher speed disk side to a lower speed disk side. When pressurized oil is supplied to the clutch 27 from a hydraulic unit 30, a clutch torque is generated therein, thereby engaging the clutch 27. Since the drum 27b is rotated at a slightly smaller rate than the hub 27a, torque dependent on the clutch torque is transferred from the hub 27a to the drum 27b and to the rear wheels. Thus, torques $T_F$ and $T_R$ transmitted to the front and rear drive shafts 7 and 11 are respectively expressed as follows.

$$T_F = \gamma \cdot T_i - T_C$$

$$T_R = (1-\gamma) \cdot T_i + KT_C$$

where Ti is input torque transmitted to the central differential 20, $\gamma$ is distribution ratio for the front wheels predetermined by the central differential 20, K is the gear ratio of gears 28, 29, and $T_C$ is the clutch torque.

Accordingly, as the clutch torque $T_C$ increases, the distribution ratio for the front torque $T_F$ becomes smaller than the distribution ratio $\gamma$. On the other hand, the distribution ratio of the rear torque $T_R$ becomes larger than the ratio $(1-\gamma)$. Thus, the torque distribution can be continuously varied.

On a throttle valve 15 of the engine 1, an actuator 16 such as a motor is attached for electrically actuating the throttle valve.

An electronic control system has left and right front-wheel speed sensors 40L and 40R, left and right rear-wheel speed sensors 41L and 41R, vehicle body acceleration sensor 42, accelerator pedal position sensor 43, throttle position sensor 44, and steering angle sensor 45. The vehicle body acceleration sensor 42 has a ground speed sensor and produces a vehicle body speed signal in accordance with the ground speed. A rotational speed sensor for the output shaft 4 of the transmission 3 may be used as a vehicle body acceleration sensor.

A control unit 50 which is supplied with outputs of the sensors 40 to 45 produces an output signal which is applied to the hydraulic unit 30 to control oil pressure applied to the oil clutch 27, and to the actuator 16 to control the throttle valve 15.

Figure 2:
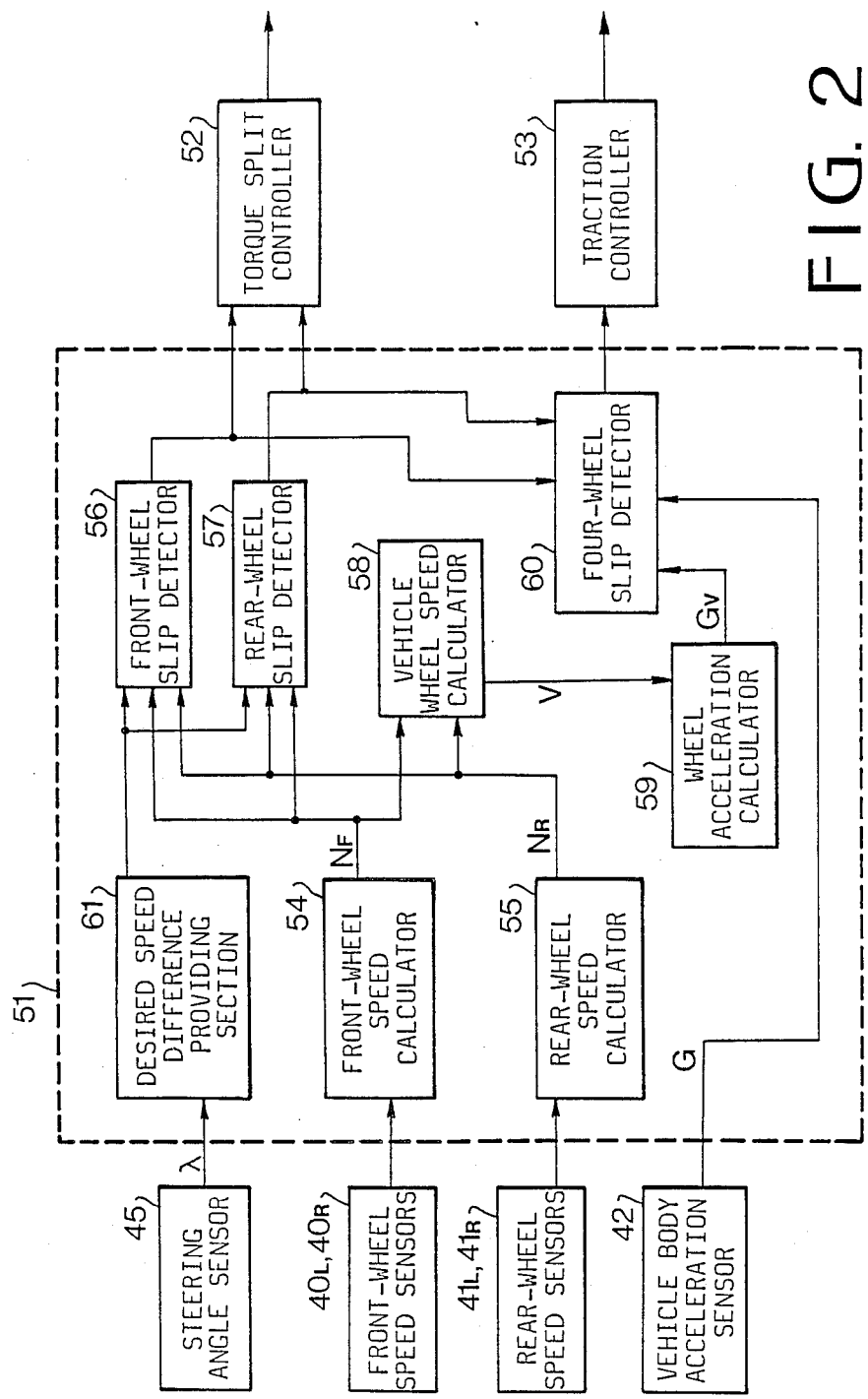
FIG. 2 shows a block diagram of a control unit of the present invention.

Referring to FIG. 2, the control unit 50 comprises a slip detector 51, a torque split controller 52, and a traction controller 53.

The slip detector 51 has a front wheel speed calculator 54 to which speeds $N_{FL}$ and $N_{FR}$ from the left and right front wheel sensors 40L and 40R are applied, and a rear wheel speed calculator 55 to which speeds $N_{RL}$ and $N_{RR}$ from the left and right rear wheel speed sensors 41L and 41R are applied. Front wheel speed $N_F$ and rear wheel speed $N_R$ are obtained from the following equations.

$$N_F = (N_{FL} + N_{FR})/2$$

$$N_R = (N_{RL} + N_{RR})/2$$

Front and rear wheel speeds $N_F$ and $N_R$ are applied to a front wheel slip detector 56 and a rear wheel slip detector 57, respectively. A steering angle $\lambda$ detected by the steering angle sensor 45 is applied to a desired speed difference providing section 61 for providing a desired difference $\Delta N_S$ between front and rear wheel speeds. At the detector 56, slipping of front wheels is detected when $N_F - N_R > \Delta N_S$. At the detector 57, slipping of rear wheels is detected when $N_R - N_F > \Delta N_S$. These detectors produce a front wheel slip signal and a rear wheel slip signal, which are applied to the torque split controller 52. The controller 52 produces a clutch pressure control signal for controlling the hydraulic unit 30 to split the torque between front and rear wheels.

The speeds $N_F$ and $N_R$ are fed to a vehicle wheel speed calculator 58 where the average speed V of the four wheels is calculated as follows.

$$V = (N_F + N_R)/2$$

The wheel speed V is applied to the vehicle wheel acceleration calculator 59 which calculates vehicle wheel acceleration $G_V$ based on $G_V = dv/dt$. The wheel acceleration $G_V$ is applied to a four-wheel slip detector 60, to which signals of the vehicle body acceleration G from the vehicle body acceleration sensor 42, and two-wheel slip signals from the detectors 56 and 57 are further applied.

It is determined that all of four wheels are slipping, or are gripping the road surface without slipping when the two-wheel slip signals are not generated from the detectors 56 and 57, where there is no difference between the front wheel speed and the rear wheel speed. Accordingly, the four-wheel slip detector 60 detects the four-wheel slip under the nonexistence of two-wheel slip signals. As described hereinafter, the detector 60 calculates an acceleration difference $\Delta G$ between wheel acceleration $G_V$ and vehicle body acceleration G (where $G_V > G$) and compares the difference $\Delta G$ with a predetermined reference value $\Delta G_S(>0)$. It is determined that when $\Delta G > \Delta G_S$, four wheels are slipping, and when $\Delta G \leq \Delta G_S$, four wheels grip the surface of the road.

A signal from the detector 60 is applied to the traction controller 53. The controller 53 produces a control signal to the actuator 16 for closing the throttle valve 15 at slipping and for positioning the valve at an opening degree in accordance with the depression position of the accelerator pedal, in gripping state.

The operation of the system is described hereinafter.

When the drive range is selected, the output torque of the engine is transmitted through the torque converter 2 and the transmission 3 to the central differential 20 at which the torque is divided to the ring gear 22 and sun gear 21, for example at a ratio 60:40, in accordance with a static load of the vehicle. The divided torques are transmitted to front and rear drive shafts 7 and 11. At the same time, the torques are transmitted to hub 27a of the oil clutch 27 through gears 5, 6 and shaft 26 and to the drum 27b through gears 29 and 28, respectively. Since the speed of the drum 27b is reduced by the gear ratio between gears 29 and 28, the torque is transmitted from hub 27a of higher speed side to the drum 27b of lower speed side.

Figure 3:
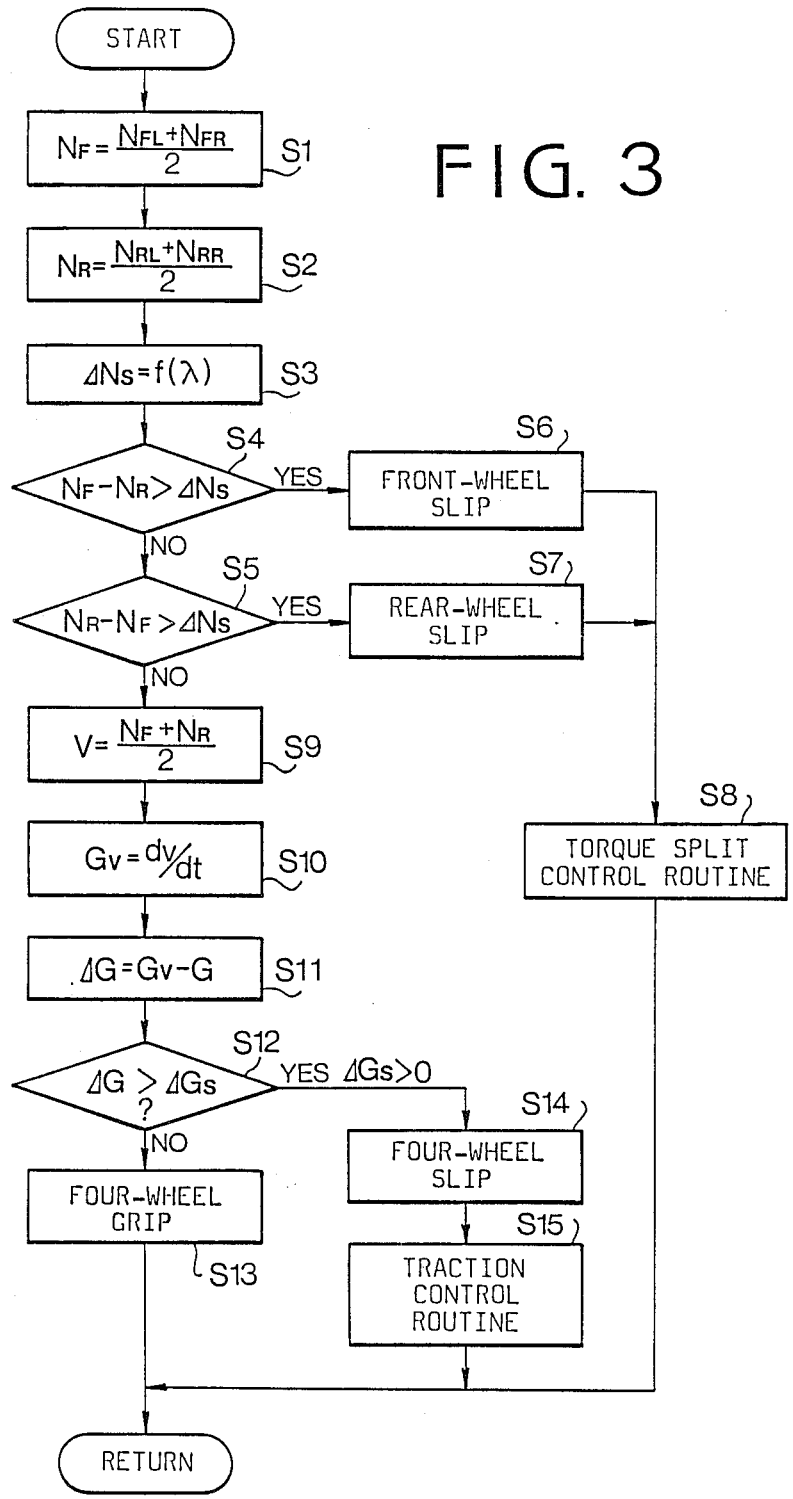
FIG. 3 is a flowchart showing the operation of the system.

Referring to FIG. 3 showing operation of the system, front wheel speed $N_F$ and rear wheel speed $N_R$ are calculated at calculators 54 and 55 at steps S1 and S2. The desired front and rear wheel speed difference $\Delta N_S$ is obtained by $\Delta N_S = f(\lambda)$ at the section 61 (step S3). Wheel speeds $N_F$ and $N_R$ are compared with the desired difference $\Delta N_S$ in detectors 56 and 57 at steps S4, S5. When one of the wheel speeds $N_F$ and $N_R$ is larger than the other wheel speed in excess of the difference $\Delta N_S$, the slipping of either front wheels or rear wheels is detected (steps S6, S7). The slip signal is fed to the controller 52. In accordance with a torque split control routine, the clutch pressure actuating signal is applied to the hydraulic control unit 30 for controlling the clutch torque in the clutch 27 (step S8). If a difference between front and rear wheel speeds is smaller than the desired difference $\Delta N_S$, the program proceeds to a step S9.

At the step S9, the wheel speed V is calculated in calculator 58. At a step S10, wheel acceleration $G_V$ is calculated in the calculator 59.

The detector 60 calculates the difference $\Delta G$ between wheel acceleration $G_V$ and vehicle body acceleration G (step S11) and compares the difference $\Delta G$ with the reference value $\Delta G_S$ (step S12). When $\Delta G$ is smaller than the value $\Delta G_S$, the gripping of four wheels is detected (step S13). The throttle valve 15 is positioned in accordance with the depression of the accelerator pedal. When $\Delta G$ is larger than $\Delta G_S$, four wheels are slipping (step S14). The slip signal is applied to the traction controller 53. In accordance with the traction control routine, a control signal is applied to the actuator 16 for controlling the throttle valve 15 responsive to the acceleration (step S15).

Figure 4:
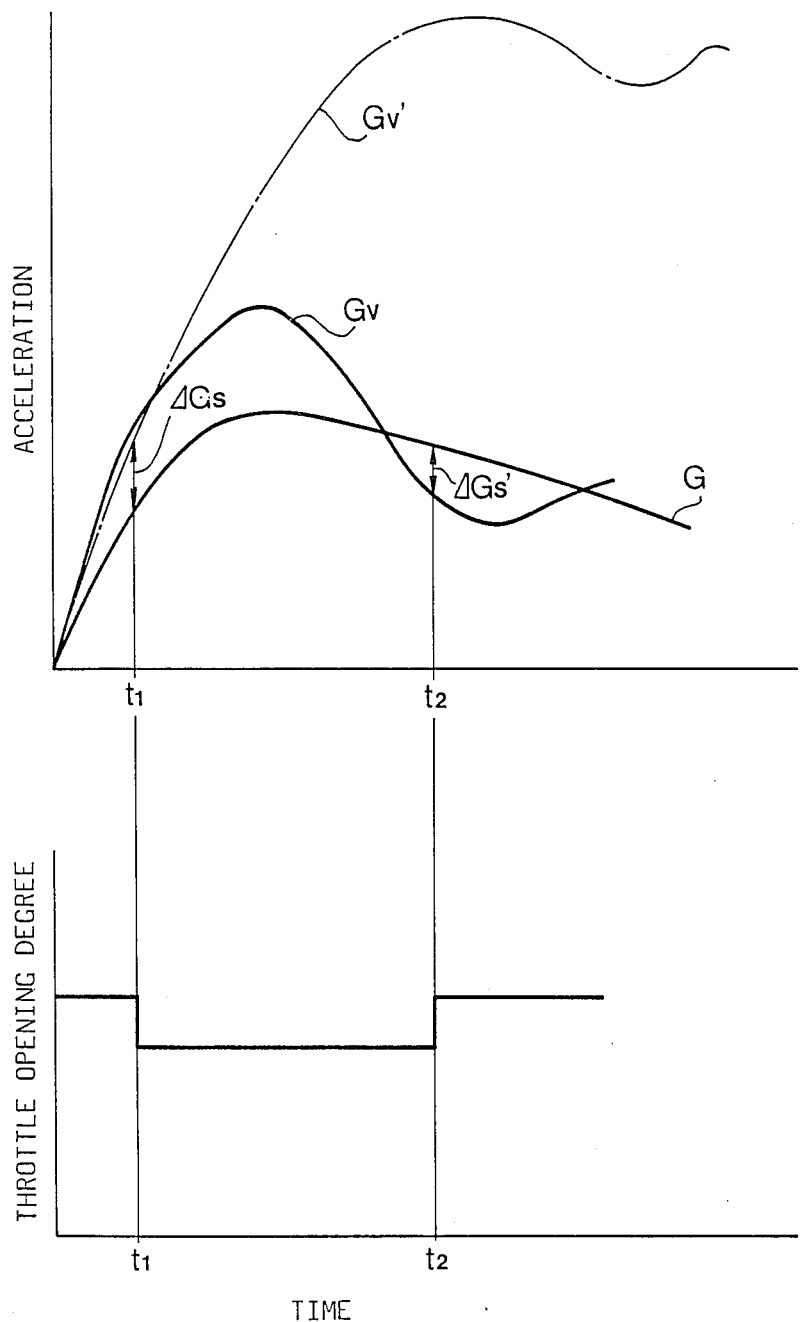
FIG. 4 is graphs showing characteristics of a traction control in accordance with a vehicle acceleration and a throttle valve opening degree.

Referring to FIG. 4 showing the traction control routine, the wheel acceleration $G_V$ rapidly rises and exceeds the reference value $\Delta G_S$ at a point t1, where slipping of four wheels is detected. The throttle valve 15 is closed by the motor 16 in accordance with the output signal of the traction controller 53. Thus, power of the engine reduces and the increase of the wheel acceleration $G_V$ is restricted. The acceleration reduces lower than a predetermined reference value $\Delta G'_S (\leq 0)$ at a point t2, where gripping of four wheels after slipping of four wheels is detected. Thus, the throttle valve is controlled to return to the original opening position and the wheel acceleration and power of the engine begin to rise. These routine is repeated for preventing slipping of four wheels. Thus, the wheel acceleration $G_V$ approaches the vehicle body acceleration G.

A chain line $G_V$ in FIG. 4 shows a characteristic of the wheel acceleration without traction control.

In accordance with the present invention, the system is employed with the wheel acceleration and the vehicle body acceleration for detecting slipping of four wheels. Further, the system detects slipping of four wheels under the condition that there is no difference between the front-wheel speed and the rear-wheel speed. Accordingly, slipping of four wheels is exactly detected.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for detecting a slip of four wheels of a four-wheel drive motor vehicle, comprising:
    front speed detector means for detecting front-wheel speed and for producing a front-wheel speed signal;
    rear speed detector means for detecting rear-wheel speed and for producing a rear-wheel speed signal;
    speed difference detector means for detecting the difference between the front-wheel speed and the rear-wheel speed and for producing a speed difference signal when the difference is larger than a predetermined value;
    wheel acceleration calculator means responsive to the front-wheel speed signal and the rear-wheel speed signal for calculating wheel acceleration;
    vehicle acceleration detector means for detecting vehicle body acceleration;
    slip detector means for detecting acceleration difference of the wheel acceleration from the vehicle body acceleration at nonexistence of the speed difference signal and for producing a four-wheel slip signal when the acceleration difference is larger than a predetermined value.

2. The system according to claim 1 wherein each of the front and rear speed detector means comprises left and right wheel speed sensors and calculator means for calculating an average speed of the left and right wheel speeds.

3. The system according to claim 2 wherein the wheel acceleration calculator comprises calculator means for calculating the average wheel speed of front and rear wheels and means for differentiating the average wheel speed.

* * * * *